J. G. DARBY.
Shade-Attachments for Plows.

No. 156,282. Patented Oct. 27, 1874.

WITNESSES:

INVENTOR:
J. G. Darby
BY
ATTORNEYS.

UNITED STATES PATENT OFFICE.

JEFFERSON G. DARBY, OF FORT MOTTE, SOUTH CAROLINA.

IMPROVEMENT IN SHADE ATTACHMENTS FOR PLOWS.

Specification forming part of Letters Patent No. 156,282, dated October 27, 1874; application filed October 3, 1874.

*To all whom it may concern:*

Be it known that I, JEFFERSON G. DARBY, of Fort Motte, in the county of Orangeburg and State of South Carolina, have invented a new and Improved Shade Attachment for Plows, of which the following is a specification:

My invention consists of a shade-supporting attachment for plows, consisting of a horizontally-adjusting cranked support of a socket for securing the stalk of the shade, which is also jointed and braced so as to oscillate the shade in a vertical plane, thus affording a complex and ample range of adjustment by which the shade may be shifted about as the plow changes direction and the sun moves along its course, the shade being mounted on a plow or other implement of like character.

Figure 1:
Figure 2:
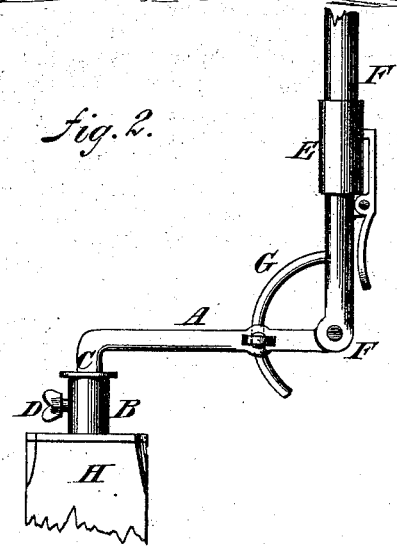

Figure 1 is a perspective view of a plow with a shade attachment contrived according to my invention. Fig. 2 is a side elevation of the attachment.

Similar letters of reference indicate corresponding parts.

A is the cranked support, fitted in the vertical socket B, by its vertical axis C, to revolve in a horizontal plane, and it is fastened in its position by a set-screw, D. The outer end of this crank supports a vertical socket, E, for the staff F of the shade, the socket being jointed to it at F, and provided with an adjusting and fastening brace, G, to allow the socket to shift to any required inclination in a vertical plane. The socket B is in this case attached to the top of the plow-standard H; but it may be attached to any other convenient part of the plow.

The attachment may also be attached to other agricultural implements, also upon wagons and other carriages.

Having thus described my invention, what I claim as new, and desire to secure by Letters Patent, is—

The improved shade attachment for plows and other implements, consisting of the socket B, crank A, and the socket E, the latter being jointed and adjustably braced to the crank, substantially as specified.

JEFFERSON G. DARBY.

Witnesses:
 D. ZIMMERMAN,
 W. V. IZLAR.